(12) United States Patent
Li

(10) Patent No.: US 12,050,269 B2
(45) Date of Patent: Jul. 30, 2024

(54) DUAL LENS RECEIVE PATH FOR LiDAR SYSTEM

(71) Applicant: Innovusion, Inc., Sunnyvale, CA (US)

(72) Inventor: Jim Li, Los Altos, CA (US)

(73) Assignee: Seyond, Inc., Sunnyvale, CA (US)

( * ) Notice: Subject to any disclaimer, the term of this patent is extended or adjusted under 35 U.S.C. 154(b) by 0 days.

(21) Appl. No.: 18/095,502

(22) Filed: Jan. 10, 2023

(65) Prior Publication Data

US 2023/0152460 A1 May 18, 2023

Related U.S. Application Data

(63) Continuation of application No. 16/545,220, filed on Aug. 20, 2019, now Pat. No. 11,579,300.

(60) Provisional application No. 62/720,350, filed on Aug. 21, 2018.

(51) Int. Cl.
G01S 17/89 (2020.01)
G01S 7/481 (2006.01)
G01S 7/4912 (2020.01)

(52) U.S. Cl.
CPC ............ *G01S 17/89* (2013.01); *G01S 7/4816* (2013.01); *G01S 7/4912* (2013.01)

(58) Field of Classification Search
CPC ....... G01S 17/89; G01S 7/4816; G01S 7/4912
USPC ...................................................... 356/5.01
See application file for complete search history.

(56) References Cited

U.S. PATENT DOCUMENTS

| | | |
|---|---|---|
| 3,897,150 A | 7/1975 | Bridges et al. |
| 4,119,362 A | 10/1978 | Holzman |
| 4,464,048 A | 8/1984 | Farlow |
| 4,676,586 A | 6/1987 | Jones et al. |
| 5,006,721 A | 4/1991 | Cameron et al. |
| 5,157,451 A | 10/1992 | Taboada |
| 5,319,434 A | 6/1994 | Croteau et al. |
| 5,336,900 A | 8/1994 | Peters et al. |
| 5,369,661 A | 11/1994 | Yamaguchi et al. |
| 5,442,358 A | 8/1995 | Keeler et al. |
| 5,504,731 A | 4/1996 | Lee et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |

(Continued)

FOREIGN PATENT DOCUMENTS

| | | |
|---|---|---|
| CN | 1677050 A | 10/2005 |
| CN | 204216401 U | 3/2015 |

(Continued)

OTHER PUBLICATIONS

Chen, X. et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Nguyen T Truong
(74) *Attorney, Agent, or Firm* — MASCHOFF BRENNAN; Ran Pang; Liang Huang

(57) ABSTRACT

A dual lens assembly positioned along an optical receive path within a LiDAR system is provided. The dual lens assembly is constructed to reduce a numerical aperture of a returned light pulse and reduce a walk-off error associated with one or more mirrors of the LiDAR system.

20 Claims, 15 Drawing Sheets

(56) References Cited

U.S. PATENT DOCUMENTS

| | | |
|---|---|---|
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,438,492 B2 | 10/2008 | Braunecker et al. |
| 7,440,084 B2 | 10/2008 | Kane |
| 7,440,175 B2 | 10/2008 | Di et al. |
| 7,489,865 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,190,030 B2 | 5/2012 | Leclair et al. |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,318,724 B2 | 4/2016 | Gehring et al. |
| 9,354,485 B2 | 5/2016 | Fermann et al. |
| 9,465,175 B2 | 10/2016 | Shi et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,879,990 B2 | 1/2018 | Klepsvik et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,889 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 9,989,629 B1 | 6/2018 | LaChapelle |
| 10,003,168 B1 | 6/2018 | Villeneuve |
| 10,012,732 B2 | 7/2018 | Eichenholz et al. |
| 10,007,001 B1 | 8/2018 | LaChapelle et al. |
| 10,042,159 B2 | 8/2018 | Dussan et al. |
| 10,081,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,672 B2 | 5/2020 | Dussan et al. |
| 10,663,596 B2 | 5/2020 | Dussan et al. |
| 10,683,564 B1 | 5/2020 | LaChapelle |
| 10,683,585 B2 | 5/2020 | McWhirter |
| 10,684,360 B2 | 6/2020 | Campbell |
| 10,852,398 B2 | 12/2020 | Yu et al. |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 2002/0136251 A1 | 9/2002 | Green et al. |
| 2002/0149757 A1 | 10/2002 | Kelsey et al. |
| 2004/0135992 A1 | 7/2004 | Munro |
| 2005/0013535 A1 | 1/2005 | Popescu |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2005/0232541 A1 | 10/2005 | Mihailov et al. |
| 2006/0071846 A1 | 4/2006 | Yanagisawa et al. |
| 2006/0132752 A1 | 8/2006 | Kane |
| 2007/0091948 A1 | 4/2007 | Di et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0028193 A1 | 1/2009 | Islam |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0237639 A1 | 9/2009 | Shinozaki et al. |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0271614 A1 | 10/2010 | Albuquerque et al. |
| 2011/0181864 A1 | 7/2011 | Schmitt et al. |
| 2011/0216792 A1 | 9/2011 | Chann et al. |
| 2012/0038903 A1 | 2/2012 | Weimer et al. |
| 2012/0124113 A1 | 5/2012 | Zalik et al. |
| 2012/0162749 A1 | 6/2012 | Gusev et al. |
| 2012/0221142 A1 | 8/2012 | Doak |
| 2013/0107016 A1 | 5/2013 | Federspeil |
| 2013/0116971 A1 | 5/2013 | Retkowski et al. |
| 2013/0241781 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0168631 A1 | 6/2014 | Haslim et al. |
| 2014/0226140 A1 | 8/2014 | Chuang et al. |
| 2014/0347850 A1 | 11/2014 | Bosch |
| 2014/0350836 A1 | 11/2014 | Stettner et al. |

(56) References Cited

U.S. PATENT DOCUMENTS

| | | |
|---|---|---|
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 8/2016 | Chung |
| 2016/0226210 A1 | 8/2016 | Zayhowski et al. |
| 2016/0245902 A1 | 8/2016 | Natnik |
| 2016/0273034 A1 | 9/2016 | Lundquist et al. |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0031678 A1 | 2/2018 | Singer et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152891 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329080 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107823 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0273365 A1 | 9/2019 | Zediker et al. |
| 2019/0277952 A1 | 9/2019 | Beuschel et al. |
| 2019/0310388 A1 | 10/2019 | LaChapelle |
| 2019/0369215 A1 | 12/2019 | Wang et al. |
| 2019/0369258 A1 | 12/2019 | Hall et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 204758260 U | 11/2015 |
| CN | 204885804 U | 12/2015 |
| CN | 107864763 A | 2/2018 |
| CN | 108132472 A | 6/2018 |
| CN | 207457508 U | 6/2018 |
| CN | 207557485 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116386 B | 5/2020 |
| CN | 109116387 B | 5/2020 |
| CN | 110031822 B | 5/2020 |
| CN | 211855309 U | 10/2020 |
| CN | 109188397 B | 11/2020 |
| CN | 109814088 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578398 B | 4/2022 |
| EP | 0 757 257 B1 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| GB | 1 427 164 A | 3/1976 |
| GB | 2000411 | 1/1979 |
| JP | 2007144687 A | 6/2007 |
| JP | 2010035385 A | 2/2010 |
| JP | 2012026921 A | 2/2012 |
| JP | 2017-003347 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

(56) References Cited

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
Helser, George, "Laser damage threshold—Galvo Mirror vs Polygon mirror", https://precisionlaserscanning.com/2016/03/laser-damage-threshold-galvo-mirror-vs-polygon-mirror/, Mar. 25, 2016, 4 pages.
Paschotta, Rüdiger, "Mirrors," https://www.rp-photonics.com/mirrors.html, 12 pages.
Johnson, Lee, "Parabolic Mirror: How It Works & Types (w/ Examples)", https://sciencing.com/parabolic-mirror-how-it-works-types-w-examples-diagram-13722364.html, updated Dec. 28, 2020, 14 pages.
Office Action issued in Japanese Patent Application No. 2019-536925 dated Nov. 9, 2021, 8 pages.

US 12,050,269 B2

DUAL LENS RECEIVE PATH FOR LiDAR SYSTEM

CROSS-REFERENCE TO A RELATED APPLICATION

This application is a continuation of U.S. application Ser. No. 16/545,220, entitled "DUAL LENS RECEIVE PATH FOR LIDAR SYSTEM", filed Aug. 20, 2019, which claims the benefit of U.S. Provisional Application No. 62/720,350, filed Aug. 21, 2018, the disclosures of which are incorporated herein in their entirety.

FIELD

This disclosure relates generally to laser scanning and, more particularly, to using a fiber optic cable in the receive path of a laser scanning system.

BACKGROUND

Light detection and ranging (LiDAR) systems use light pulses to create an image or point cloud of the external environment. Some typical LiDAR systems include a light source, a pulse steering system, and light detector. The light source generates light pulses that are directed by the pulse steering system in particular directions when being transmitted from the LiDAR system. When a transmitted light pulse is scattered by an object, some of the scattered light is returned to the LiDAR system as a returned pulse. The light detector detects the returned pulse. Using the time it took for the returned pulse to be detected after the light pulse was transmitted and the speed of light, the LiDAR system can determine the distance to the object along the path of the transmitted light pulse. The pulse steering system can direct light pulses along different paths to allow the LiDAR system to scan the surrounding environment and produce an image or point cloud. LiDAR systems can also use techniques other than time-of-flight and scanning to measure the surrounding environment

SUMMARY

The following presents a simplified summary of one or more examples to provide a basic understanding of the disclosure. This summary is not an extensive overview of all contemplated examples, and is not intended to either identify key or critical elements of all examples or delineate the scope of any or all examples. Its purpose is to present some concepts of one or more examples in a simplified form as a prelude to the more detailed description that is presented below.

A dual lens assembly positioned along an optical receive path within a LiDAR system is provided. The dual lens assembly is constructed to reduce a numerical aperture of a returned light pulse and reduce a walk-off error associated with one or more mirrors of the LiDAR system.

In some embodiments, a light detection and ranging (LiDAR) system is provided that includes a light source configured to generate a pulse signal that is transmitted by the LiDAR system, one or more mirrors configured to steer a returned light pulse associated with the transmitted pulse signal along an optical receive path, a dual lens assembly positioned along the optical receive path, wherein the dual lens assembly is constructed to reduce a numerical aperture of the returned light pulse and reduce a walk-off error associated with the one or more mirrors, and a fiber configured to receive the returned light pulse along the optical receive path from the dual lens assembly.

In another embodiment, a light detection and ranging (LiDAR) system is provided that includes a steering system operative to steer a plurality of returned light pulses along an optical receive path, a fiber configured to receive the plurality of returned light pulses along the optical receive path, the fiber comprising a core, and a dual lens assembly positioned along the optical receive path in between the steering system and the fiber, wherein the dual lens assembly optimizes a spot beam produced by the plurality returned light pulses for entry into the core.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some LiDAR systems use an open air optical path or optical path with one or more lenses to receive and optimize detection of returned pulse signals. This has a disadvantage in that the detection mechanism needs to either be close to where the returned pulse enters the system or a potentially complex system needs to be in place to redirect the returned pulse signal to the detector. In some embodiments of the present technology, an optical fiber is used to direct returned light pulses to a light detector. This way, the detector can be placed in an arbitrary location relative to the signal steering system that receives the return signal. Further, the detector can be placed fairly close to the exit end of the fiber, thus improving the integrity and amount of the detected light signals. Depending on how the returned light pulse is received by the LiDAR system, errors (e.g., walk-off error) that reduce signal strength or place more stringent tolerances on the system may be reduced. Some embodiments of the present technology use a field lens to redirect returned light pulses into an optical fiber core or directly into a light detector, thus reducing the errors due to walk-off of the pulses. Embodiments discussed herein use a dual lens assembly to maximize light transfer into an optical fiber core by controlling the numerical aperture (NA) of the light and by minimizing walk-off errors.

Figure 1:
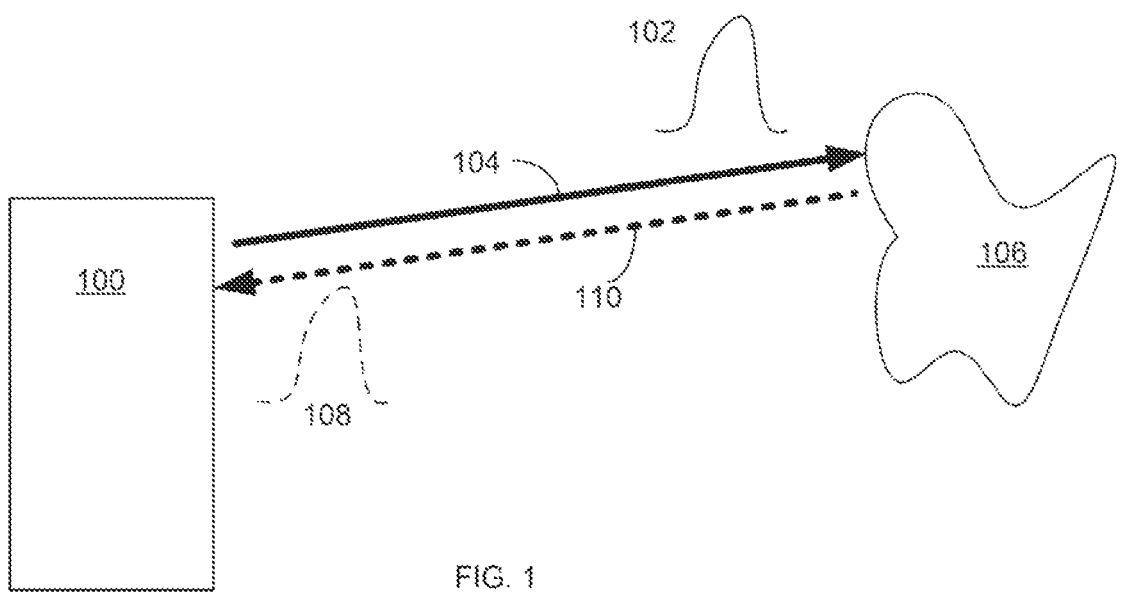
FIG. 1 illustrates an exemplary LiDAR system using pulse signal to measure distances to points in the outside environment.

Some LiDAR systems use the time-of-flight of light signals (e.g., light pulses) to determine the distance to objects in the path of the light. For example, with respect to FIG. 1, an exemplary LiDAR system 100 includes a laser light source (e.g., a fiber laser), a steering system (e.g., a system of one or more moving mirrors), and a light detector (e.g., a photon detector with one or more optics). LiDAR system 100 transmits light pulse 102 along path 104 as determined by the steering system of LiDAR system 100. In the depicted example, light pulse 102, which is generated by the laser light source, is a short pulse of laser light. Further, the signal steering system of the LiDAR system 100 is a pulse signal steering system. However, it should be appreciated that LiDAR systems can operate by generating, transmitting, and detecting light signals that are not pulsed and/use derive ranges to object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulses also may be applicable to LiDAR systems that do not use one or both of these techniques.

Referring back to FIG. 1 (a time-of-flight LiDAR system that uses light pulses) when light pulse 102 reaches object 106, light pulse 102 scatters and returned light pulse 108 will be reflected back to system 100 along path 110. The time from when transmitted light pulse 102 leaves LiDAR system 100 to when returned light pulse 108 arrives back at LiDAR system 100 can be measured (e.g., by a processor or other electronics within the LiDAR system). This time-of-flight combined with the knowledge of the speed of light can be used to determine the range/distance from LiDAR system 100 to the point on object 106 where light pulse 102 scattered.

Figure 2:
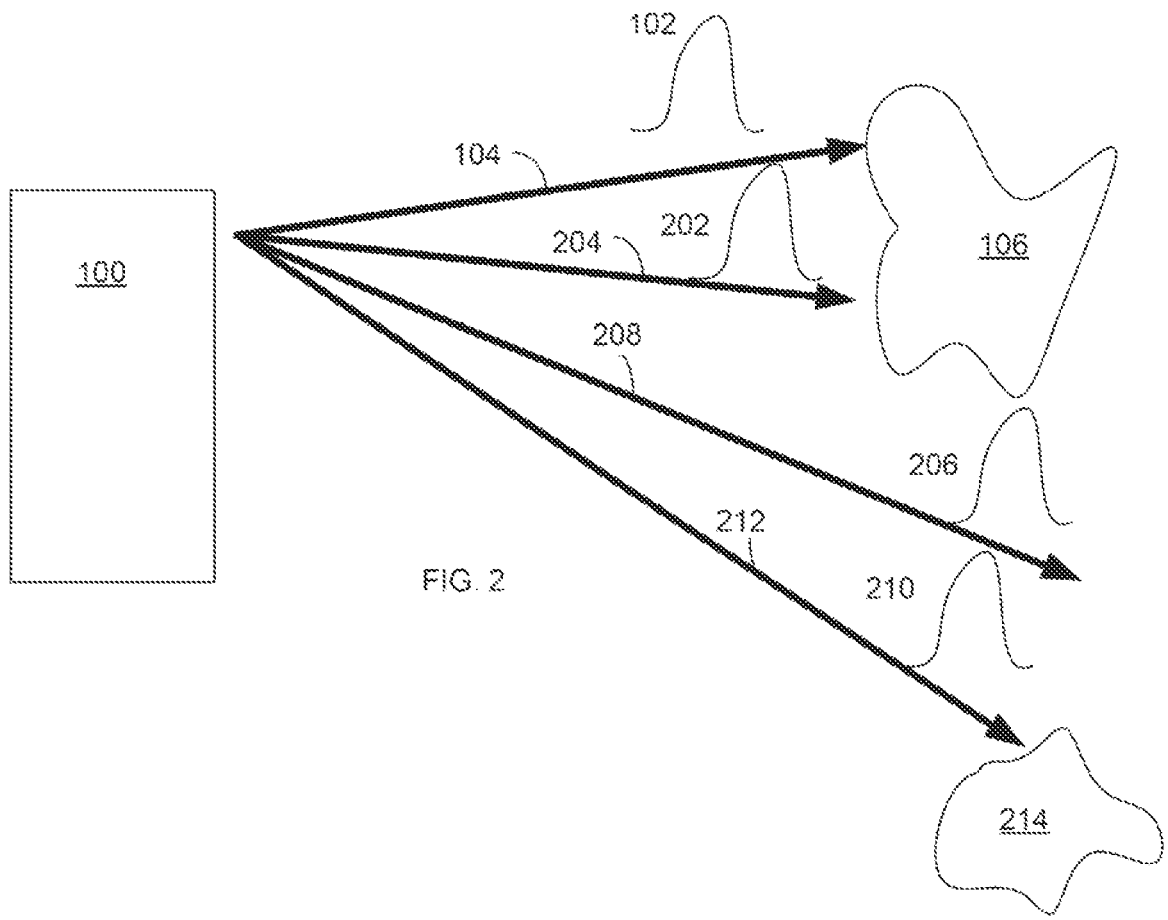
FIG. 2 illustrates the exemplary LiDAR system using pulse signal to measure distances to points in the outside environment.
Figure 3:
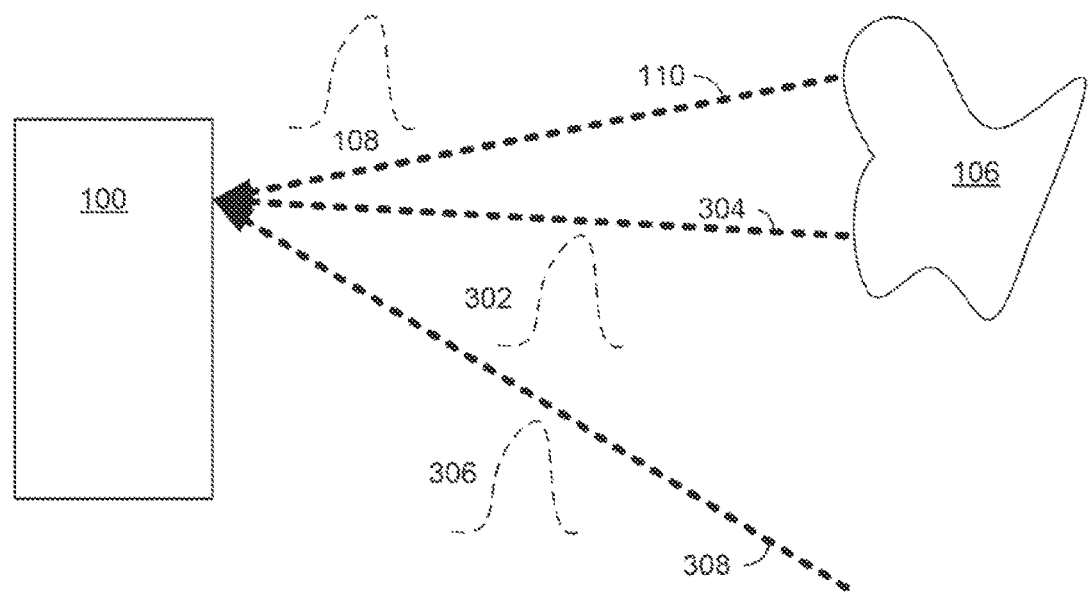
FIG. 3 illustrates the exemplary LiDAR system using pulse signal to measure distances to points in the outside environment.

By directing many light pulses, as depicted in FIG. 2, LiDAR system 100 scans the external environment (e.g., by directing light pulses 102, 202, 206, 210 along paths 104, 204, 208, 212, respectively). As depicted in FIG. 3, LiDAR system 100 receives returned light pulses 108, 302, 306 (which correspond to transmitted light pulses 102, 202, 210, respectively) back after objects 106 and 214 scatter the transmitted light pulses and reflect pulses back along paths 110, 304, 308, respectively. Based on the direction of the transmitted light pulses (as determined by LiDAR system 100) as well as the calculated range from LiDAR system 100 to the points on objects that scatter the light pulses (e.g., the points on objects 106 and 214), the surroundings within the detection range (e.g., the field of view between path 104 and 212, inclusively) can be precisely plotted (e.g., a point cloud or image can be created).

If a corresponding light pulse is not received for a particular transmitted light pulse, then it can be determined that there are no objects within a certain range of LiDAR system 100 (e.g., the max scanning distance of LiDAR system 100). For example, in FIG. 2, light pulse 206 will not have a corresponding returned light pulse (as depicted in FIG. 3) because it did not produce a scattering event along its transmission path 208 within the predetermined detection range. LiDAR system 100 (or an external system communication with LiDAR system 100) can interpret this as no object being along path 208 within the detection range of LiDAR system 100.

In FIG. 2, transmitted light pulses 102, 202, 206, 210 can be transmitted in any order, serially, in parallel, or based on other timings with respect to each other. Additionally, while FIG. 2 depicts a 1-dimensional array of transmitted light pulses, LiDAR system 100 optionally also directs similar arrays of transmitted light pulses along other planes so that a 2-dimensional array of light pulses is transmitted. This 2-dimensional array can be transmitted point-by-point, line-by-line, all at once, or in some other manner. The point cloud or image from a 1-dimensional array (e.g., a single horizontal line) will produce 2-dimensional information (e.g., (1) the horizontal transmission direction and (2) the range to objects). The point cloud or image from a 2-dimensional array will have 3-dimensional information (e.g., (1) the horizontal transmission direction, (2) the vertical transmission direction, and (3) the range to objects).

The density of points in point cloud or image from a LiDAR system 100 is equal to the number of pulses divided by the field of view. Given that the field of view is fixed, to increase the density of points generated by one set of transmission-receiving optics, the LiDAR system should fire a pulse more frequently, in other words, a light source with a higher repetition rate is needed. However, by sending pulses more frequently the farthest distance that the LiDAR system can detect may be more limited. For example, if a returned signal from a far object is received after the system transmits the next pulse, the return signals may be detected in a different order than the order in which the corresponding signals are transmitted and get mixed up if the system cannot correctly correlate the returned signals with the transmitted signals. To illustrate, consider an exemplary LiDAR system that can transmit laser pulses with a repetition rate between 500 kHz and 1 MHz. Based on the time it takes for a pulse to return to the LiDAR system and to avoid mix-up of returned pulses from consecutive pulses in conventional LiDAR design, the farthest distance the LiDAR system can detect may be 300 meters and 150 meters for 500 kHz and 1 Mhz, respectively. The density of points of a LiDAR system with 500 kHz repetition rate is half of that with 1 MHz. Thus, this example demonstrates that, if the system cannot correctly correlate returned signals that arrive out of order, increasing the repetition rate from 500 kHz to 1 Mhz (and thus improving the density of points of the system) would significantly reduce the detection range of the system.

Figure 4:
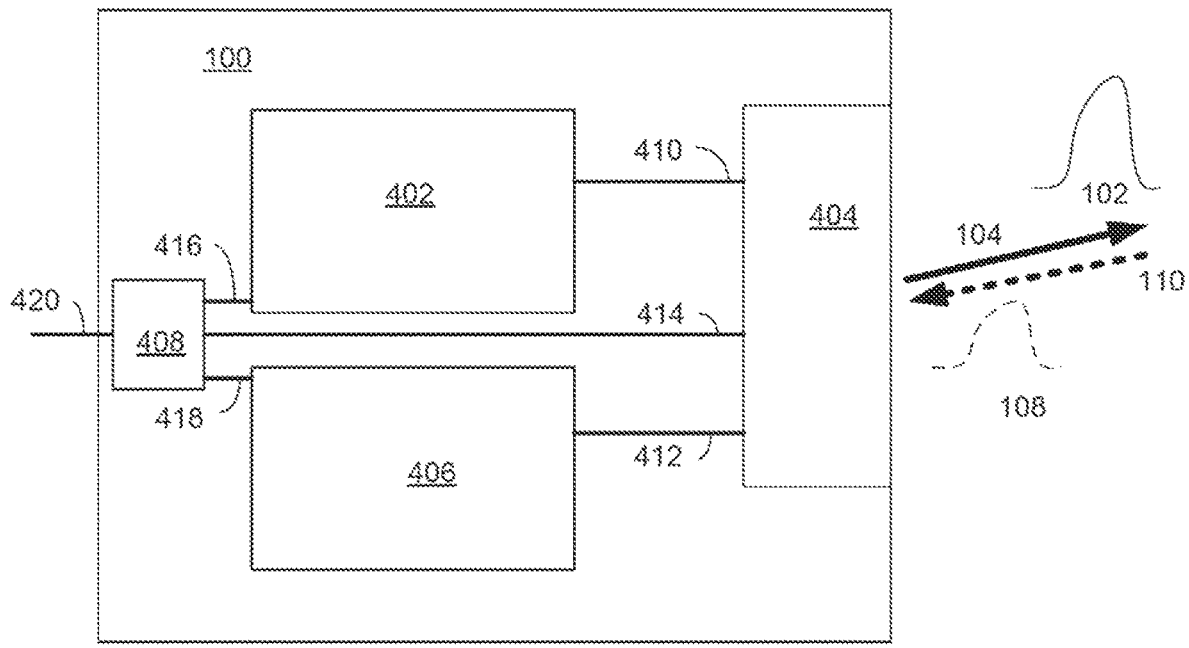
FIG. 4 depicts a logical block diagram of the exemplary LiDAR system.

FIG. 4 depicts a logical block diagram of LiDAR system 100, which includes light source 402, signal steering system 404, pulse detector 406, and controller 408. These components are coupled together using communications paths 410, 412, 414, 416, and 418. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 410 is one or more optical fibers, communication path 412 represents an optical path, and communication paths 414, 416, 418, and 420 are all one or more electrical wires that carry electrical signals. The communications paths can also include more than one of the above types of communication mediums (e.g., they can include an optical fiber and an optical path or one or more optical fibers and one or more electrical wires).

LiDAR system 100 can also include other components not depicted in FIG. 4, such as power buses, power supplies, LED indicators, switches, etc. Additionally, other connections among components may be present, such as a direct connection between light source 402 and light detector 406 so that light detector 406 can accurately measure the time from when light source 402 transmits a light pulse until light detector 406 detects a returned light pulse.

Figure 5:
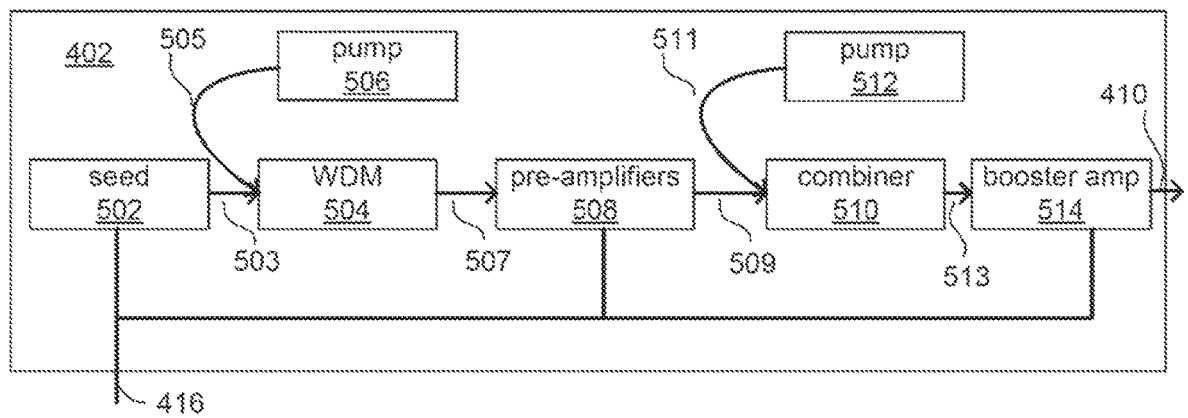
FIG. 5 depicts a light source of the exemplary LiDAR system.

FIG. 5 depicts a logical block diagram of one example of light source 402 that is based on a laser fiber, although any number of light sources with varying architecture could be used as part of the LiDAR system. Light source 402 uses seed 502 to generate initial light pulses of one or more wavelengths (e.g., 1550 nm), which are provided to wavelength-division multiplexor (WDM) 504 via fiber 503. Pump 506 also provides laser power (of a different wavelength, such as 980 nm) to WDM 504 via fiber 505. The output of WDM 504 is provided to pre-amplifiers 508 (which includes one or more amplifiers) which provides its output to combiner 510 via fiber 509. Combiner 510 also takes laser power from pump 512 via fiber 511 and provides pulses via fiber 513 to booster amplifier 514, which produces output light pulses on fiber 410. The outputted light pulses are then fed to steering system 404. In some variations, light source 402 can produce pulses of different amplitudes based on the fiber gain profile of the fiber used in the source. Communication path 416 couples light source 402 to controller 408 (FIG. 4) so that components of light source 402 can be controlled by or otherwise communicate with controller 408. Alternatively, light source 402 may include its own controller. Instead of controller 408 communicating directly with components of light source 402, a dedicated light source controller communicates with controller 408 and controls and/or communicates with the components of light source 402. Light source 402 also includes other components not shown, such as one or more power connectors, power supplies, and/or power lines.

Some other light sources include one or more laser diodes, short-cavity fiber lasers, solid-state lasers, and/or tunable external cavity diode lasers, configured to generate one or more light signals at various wavelengths. In some examples, light sources use amplifiers (e.g., pre-amps or booster amps) include a doped optical fiber amplifier, a solid-state bulk amplifier, and/or a semiconductor optical amplifier, configured to receive and amplify light signals.

Returning to FIG. 4, signal steering system 404 includes any number of components for steering light signals generated by light source 402. In some examples, signal steering system 404 may include one or more optical redirection elements (e.g., mirrors or lens) that steer light pulses (e.g., by rotating, vibrating, or directing) along a transmit path to scan the external environment. For example, these optical redirection elements may include MEMS mirrors, rotating polyhedron mirrors, or stationary mirrors to steer the transmitted pulse signals to different directions. Signal steering system 404 optionally also includes other optical components, such as dispersion optics (e.g., diffuser lenses, prisms, or gratings) to further expand the coverage of the transmitted signal in order to increase the LiDAR system 100's transmission area (i.e., field of view). An example signal steering system is described in U.S. Patent Application Publication No. 2018/0188355, entitled "2D Scanning High Precision LiDAR Using Combination of Rotating Concave Mirror and Beam Steering Devices," the content of which is incorporated by reference in its entirety herein for all purposes. In some examples, signal steering system 404 does not contain any active optical components (e.g., it does not contain any amplifiers). In some other examples, one or more of the components from light source 402, such as a booster amplifier, may be included in signal steering system 404. In some instances, signal steering system 404 can be considered a LiDAR head or LiDAR scanner.

Some implementations of signal steering systems include one or more optical redirection elements (e.g., mirrors or lens) that steers returned light signals (e.g., by rotating, vibrating, or directing) along a receive path to direct the returned light signals to the light detector. The optical redirection elements that direct light signals along the transmit and receive paths may be the same components (e.g., shared), separate components (e.g., dedicated), and/or a combination of shared and separate components. This means that in some cases the transmit and receive paths are different although they may partially overlap (or in some cases, substantially overlap).

Figure 6:
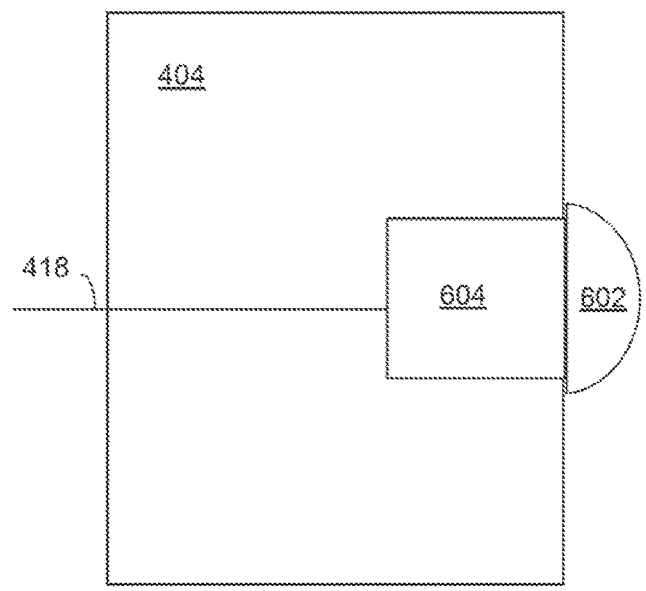
FIG. 6 depicts a light detector of the exemplary LiDAR system.

FIG. 6 depicts a logical block diagram of one possible arrangement of components in light detector 404 of LiDAR system 100 (FIG. 4). Light detector 404 includes optics 604 (e.g., a system of one or more optical lenses) and detector 602 (e.g., a charge coupled device (CCD), a photodiode, an avalanche photodiode, a photomultiplier vacuum tube, an image sensor, etc.) that is connected to controller 408 (FIG. 4) via communication path 418. The optics 604 may include one or more photo lenses to receive, focus, and direct the returned signals. Light detector 404 can include filters to selectively pass light of certain wavelengths. Light detector 404 can also include a timing circuit that measures the time from when a pulse is transmitted to when a corresponding returned pulse is detected. This data can then be transmitted to controller 408 (FIG. 4) or to other devices via communication line 418. Light detector 404 can also receive information about when light source 402 transmitted a light pulse via communication line 418 or other communications lines that are not shown (e.g., an optical fiber from light source 402 that samples transmitted light pulses). Alternatively, light detector 404 can provide signals via communication line 418 that indicate when returned light pulses are detected. Other pulse data, such as power, pulse shape, and/or wavelength, can also be communicated.

Returning to FIG. 4, controller 408 contains components for the control of LiDAR system 100 and communication with external devices that use the system. For example, controller 408 optionally includes one or more processors, memories, communication interfaces, sensors, storage devices, clocks, ASICs, FPGAs, and/or other devices that control light source 402, signal steering system 404, and/or light detector 406. In some examples, controller 408 controls the power, rate, timing, and/or other properties of light signals generated by light source 402; controls the speed, transmit direction, and/or other parameters of light steering system 404; and/or controls the sensitivity and/or other parameters of light detector 406.

Controller 408 optionally is also configured to process data received from these components. In some examples, controller determines the time it takes from transmitting a light pulse until a corresponding returned light pulse is received; determines when a returned light pulse is not received for a transmitted light pulse; determines the transmitted direction (e.g., horizontal and/or vertical information) for a transmitted/returned light pulse; determines the estimated range in a particular direction; and/or determines any other type of data relevant to LiDAR system 100.

Figure 7:
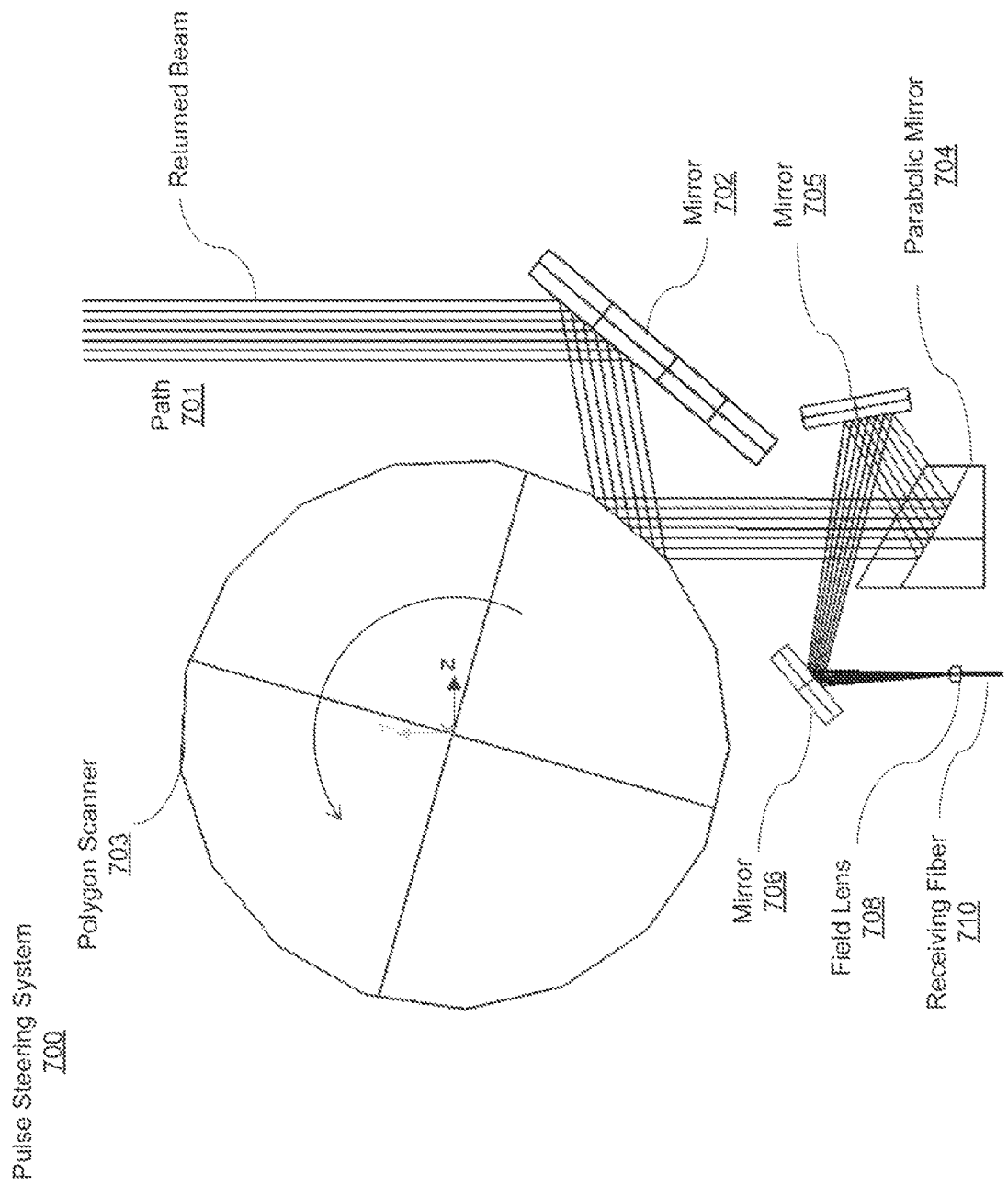
FIG. 7 depicts a steering system of the exemplary LiDAR system including a field lens and a fiber.

FIG. 7 depicts pulse steering system 700, which can be used to implement pulse steering system 404 discussed above. Pulse steering system 700 receives returned pulses along paths 701 and includes mirror 702, polygon scanner 703 (e.g., a reflective polygon rotating around the x-axis as shown in the figure), parabolic mirror 704 (e.g., a mirror focusing the pulse paths), mirror 705, and mirror 706. Part of pulse steering system 700 is also used to direct transmitting light pulses. For example, a fiber positioned with mirror 705, mirror 702, or in some location respective to polygon scanner 703 optionally provides light pulses that can be directed along different paths outside of the LiDAR system by pulse steering system 700.

In some embodiments, returned light pulses collected by pulse steering system 700 are redirected into an optical fiber (e.g., fiber 710), which carries the returned light pulses to a photodetector. This allows the pulse steering system to be located in an arbitrary position with respect to the light detector.

In some embodiments of the present technology, a lens or other optical element is used in the optical receive path to increase the tolerance of walk-off error of the returned pulses. For example, in FIG. 7, field lens 708 is placed in the path of return pulses traveling from mirror 706 to fiber 710. The use of a lens (e.g., a cylindrical lens) or other types of optical element mitigates beam walk-off in receiving channel.

Figure 8:
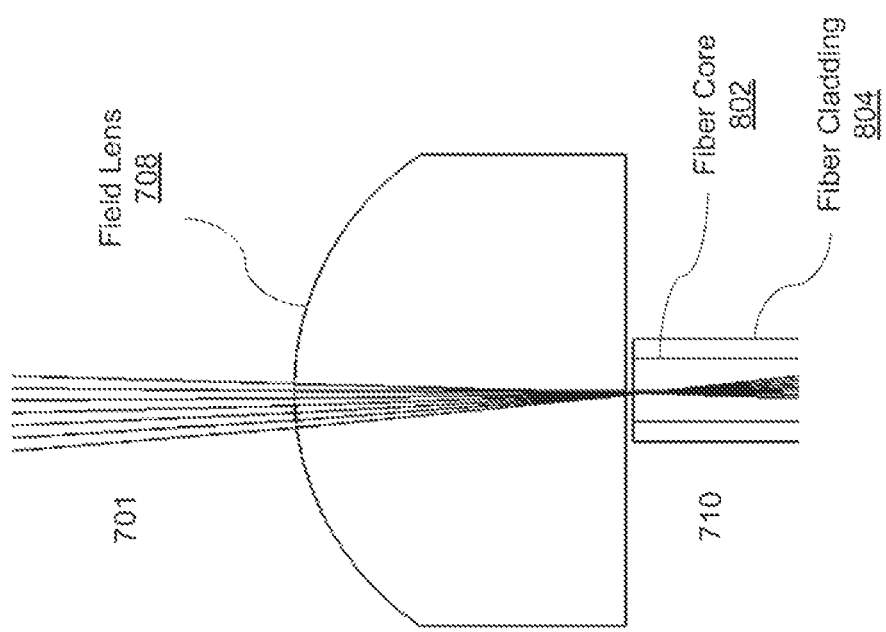
FIG. 8 depicts an exemplary configuration of the field lens and the fiber.

FIG. 8 depicts field lens 708 positioned to redirect returned light pulses traveling along paths 701 into the fiber core 802, which is surrounded by fiber cladding 804. Without field lens 708 (or other optical elements in other embodiments), light pulses may hit fiber cladding 804 or miss fiber 710 altogether. In FIG. 8, field lens 708 is a cylindrical lens that can be shaped into spherical, conic, or aspherical shapes. The cylindrical field lens can be made using traditional lens fabrication process such as glass polishing and grinding, precision glass molding, or precision plastic molding.

In some embodiments of the present technology, the field lens 708 is configured to redirect returned light pulses traveling along paths 710 directly to a detector (e.g., an avalanche photodiode). In these embodiments, the steering system does not include a fiber. The returned light pulses are directed via the mirrors of the steering system to reach the detector. The detector can be placed fairly close to or directly on the field lens to improve the integrity of the detected signals.

Figure 9:
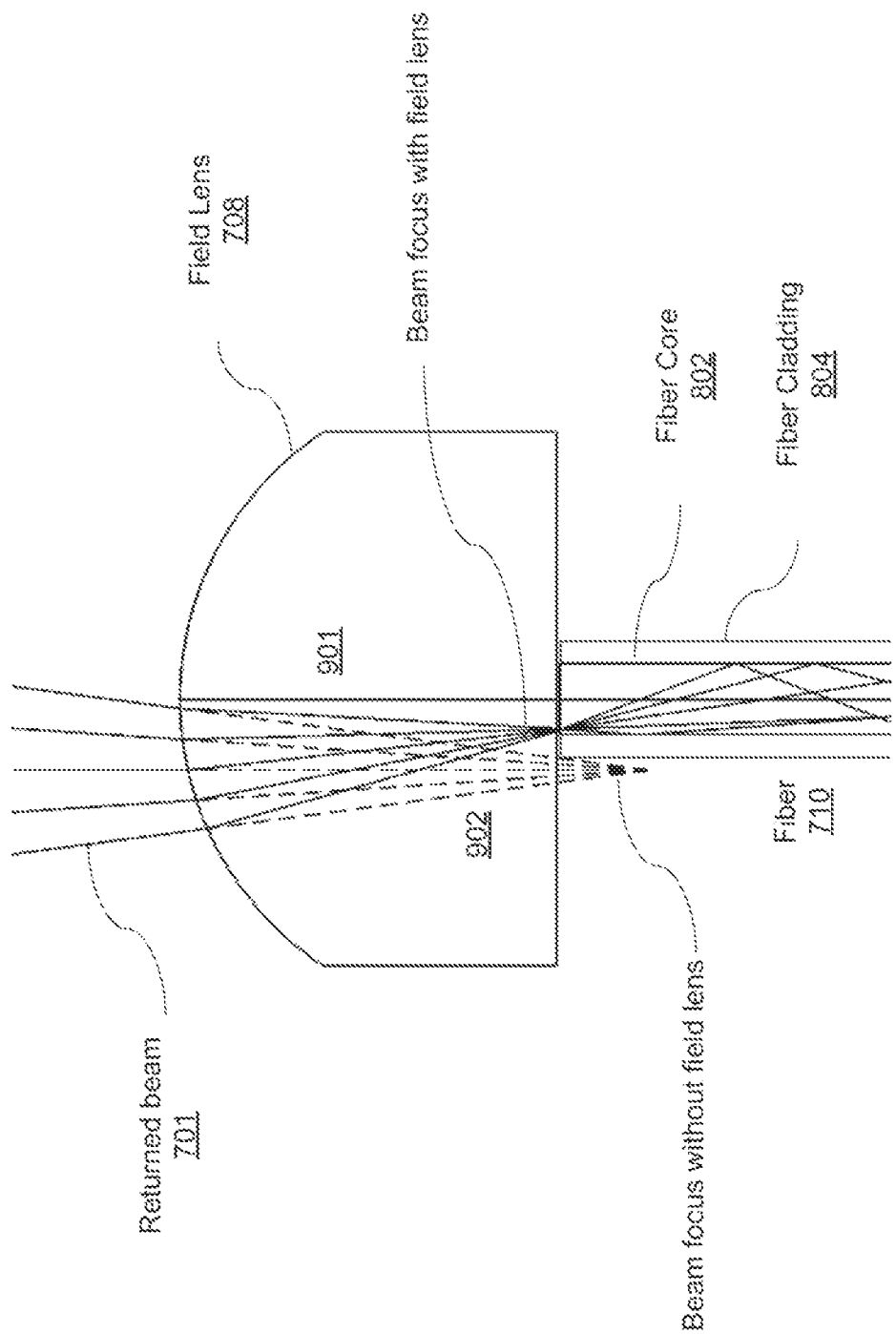
FIG. 9 depicts beam walk-off (in dashed line) that may occur in a steering system without the field lens and beam bending (in solid line) that may occur in a steering system with the field lens.

FIG. 9 depicts paths 901 of returned light pulses that are redirected by field lens 708 (or other elements). In contrast, paths 902 show that returned light pulses that are not redirected will completely miss fiber 710. These paths may be misaligned to fiber 710 (and more specifically to fiber core 802) because of various errors, process variations, environmental conditions, fabrication of the hardware such as the mirrors, and other effects that are difficult or impossible to fully account for. For example, polygon scanner 703 has a certain amount of jitter in its rotation speed, thus introducing walk-off of the pulses during normal operation of the steering system. When polygon scanner 703 transmits a pulse, the polygon continues to rotate, which means the optical receive path through the steering system is going to be slightly offset from the optical transmit path through the steering system. The amount of offset depends in part on how much the polygon rotated between when the pulse was transmitted and the return pulse was received. The speed of rotation can be controlled only within a certain margin. The distance (and therefore time) a pulse must travel depends on the distance to an object that scatters the pulse. These two variations determine, in-part, the amount of rotation that occurs after a pulse is transmitted and when a corresponding return pulse is received. The use of field lens 708 (or other components) in the optical path allows the system to tolerate more variation in the rotation (and other sources in error) by redirecting more of the returned pulses into fiber core 802.

Figure 10:
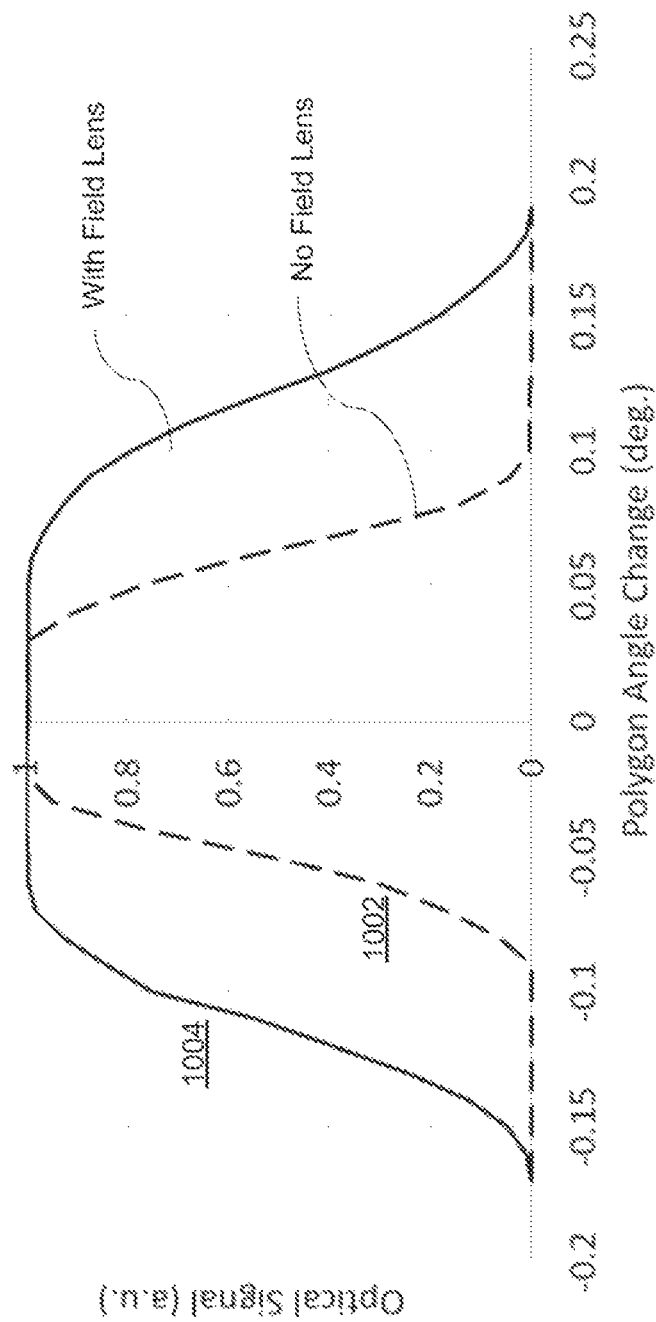
FIG. 10 illustrates the relationships between a returned optical signal and the angle change of a polygon in the exemplary steering system, with or without a field lens.

The improved walk-off characteristics of embodiments of the present technology are shown in FIG. 10. Curve 1004 shows that the window of polygon angles that provide for little to no degradation in the optical signal is about twice as large as the window provided without the field lens, as shown by curve 1002.

Figure 11:
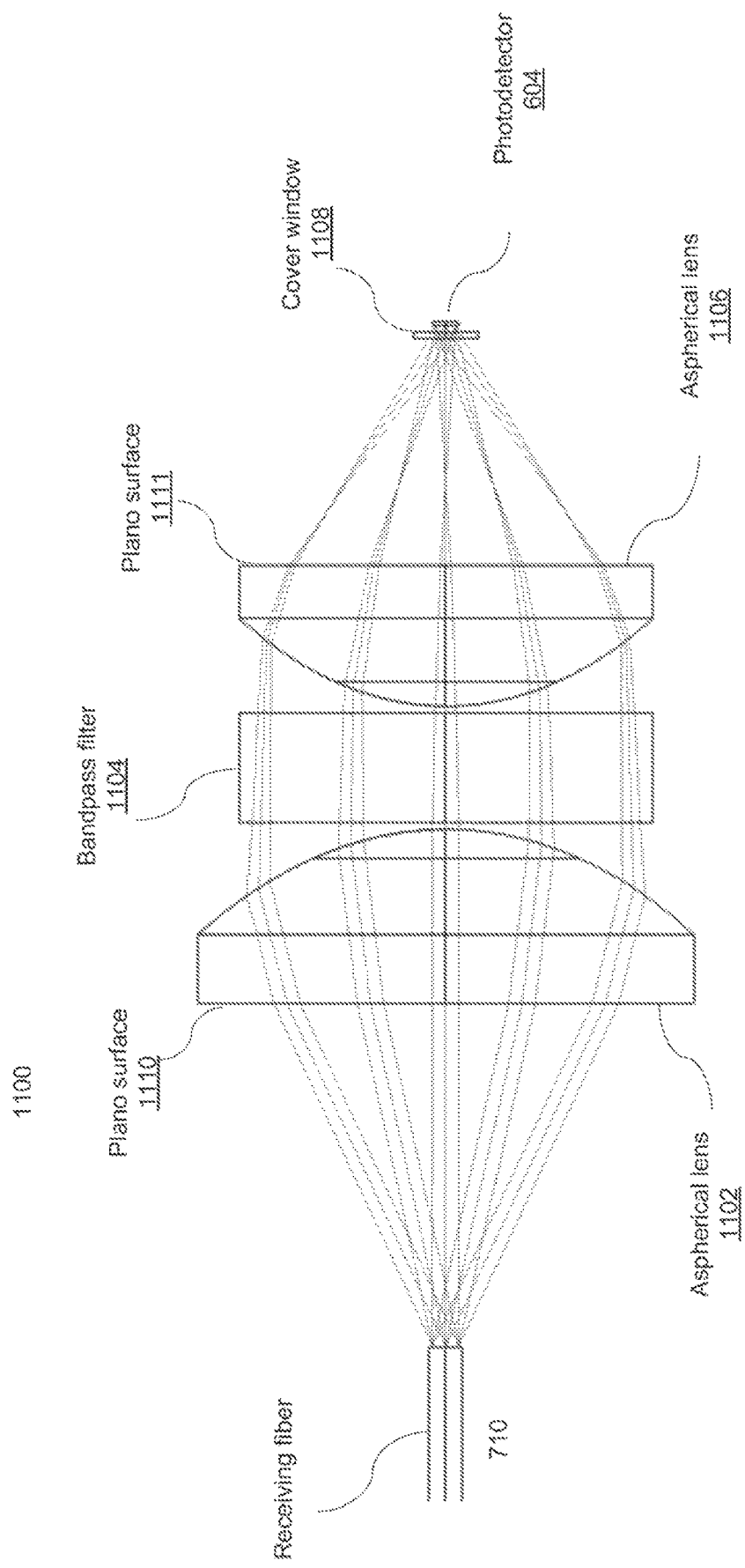
FIG. 11 depicts an exemplary optical coupling of the fiber to a photodetector of the exemplary LiDAR system.

FIG. 11 shows one example of how the returned light pulses from the exit end of fiber 710 can be coupled to photodetector 604 (FIG. 6) by a plurality of lenses, which may be spherical, conic, aspherical, or ball lens. Coupling 1100 includes aspherical lens 1102, bandpass filter 1104 (which is matched to the light source frequency), and aspherical lens 1106. The narrow bandpass filter is positioned between the lens stack to suppress light whose wavelength is outside the signal wavelength band. The multi-layer bandpass film can also be deposited onto the plano surface of either the first lens 1102 or the second lens 1106. Cover window 1108 protects photodetector 604, which can detect when a returned light pulse is received. The coupling optic shown in FIG. 11 is applicable in cases where the detecting area of the photodetector is different from fiber core area, especially where the detecting area of the photodetector is smaller than the fiber core area. Small area detectors are generally desirable because of fast transient response and lower cost. In some examples, the detecting surface of the photodetector has a similar or identical diameter (e.g., 200 µm) as the optical fiber core. In other cases where the detecting area of the photodetector can be chosen to be larger than the fiber core area, detector can be placed or glued directly onto the end facet of the fiber.

Figure 12:
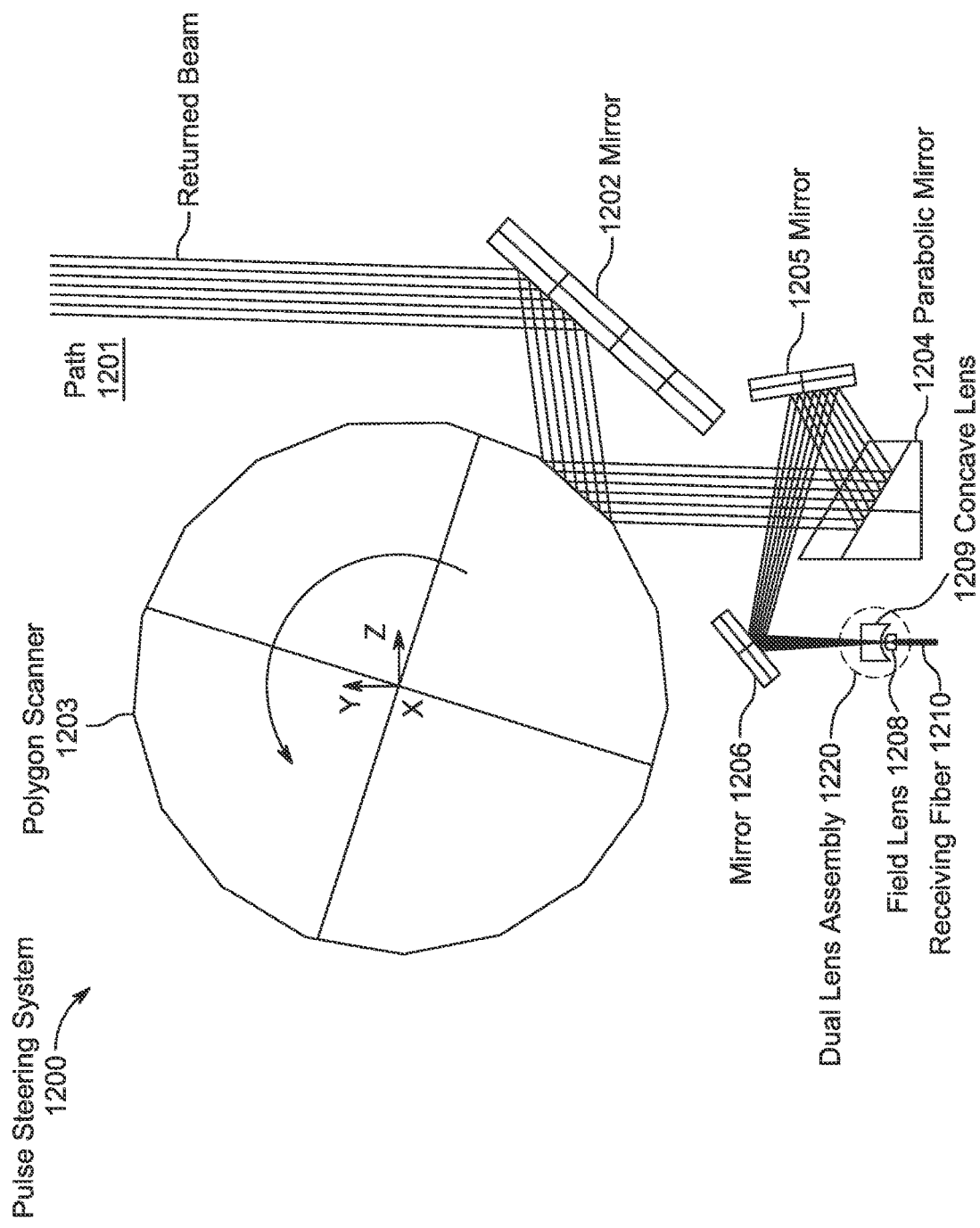
FIG. 12 depicts a steering system of the exemplary LiDAR system including a dual lens and a fiber.

FIG. 12 depicts pulse steering system 1200, which can be used to implement pulse steering system 404 discussed above in a similar manner as pulse steering system 700. Pulse steering system 1200 receives returned pulses along paths 1201 and includes mirror 1202, polygon scanner 1203 (e.g., a reflective polygon rotating around the x-axis as shown in the figure), parabolic mirror 1204 (e.g., a mirror focusing the pulse paths), mirror 1205, and mirror 1206. Part of pulse steering system 1200 is also used to direct transmitting light pulses. For example, a fiber positioned with mirror 1205, mirror 1202, or in some location respective to polygon scanner 1203 optionally provides light pulses that can be directed along different paths outside of the LiDAR system by pulse steering system 1200.

In some embodiments, returned light pulses collected by pulse steering system 1200 are redirected into an optical fiber (e.g., fiber 1210), which carries the returned light pulses to a photodetector. This allows the pulse steering system to be located in an arbitrary position with respect to the light detector.

In some embodiments, a dual lens assembly or other optical element is used in the optical receive path to improve walk-off characteristics, increase the tolerance of walk-off error, and reduce numerical aperture (NA). For example, in FIG. 12, dual lens assembly 1220 is placed in the path of return pulses traveling from mirror 1206 to fiber 1210, and may include concave lens 1205 and field lens 1208. In this example, concave lens 1205 is placed upstream of field lens 1208. Concave lens 1209 may improve numerical aperture while field lens 1208 may improve walk-off characteristics and increase the tolerance of walk-off error. In some embodiments, field lens 1208 can be a convex lens or positive lens that is operative to bend light towards a desired optical axis. A dual lens system allows the benefits of both the concave lens and the field lens in the light transmission system.

Figure 13A:
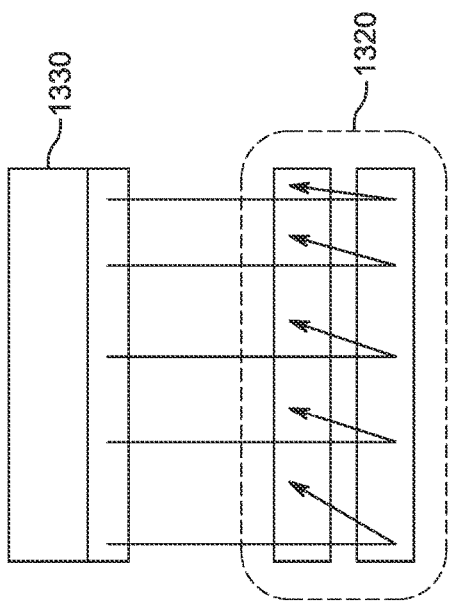
FIGS. 13A-13D illustrate the relationship between the numerical apertures of a returned optical signal with respect to polygon scanner geometry.
Figure 13B:
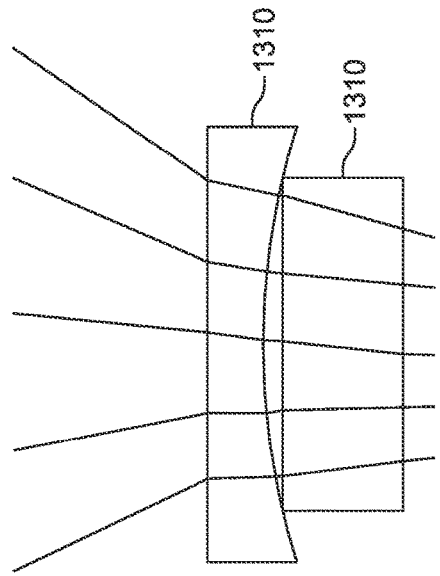
Figure 13C:
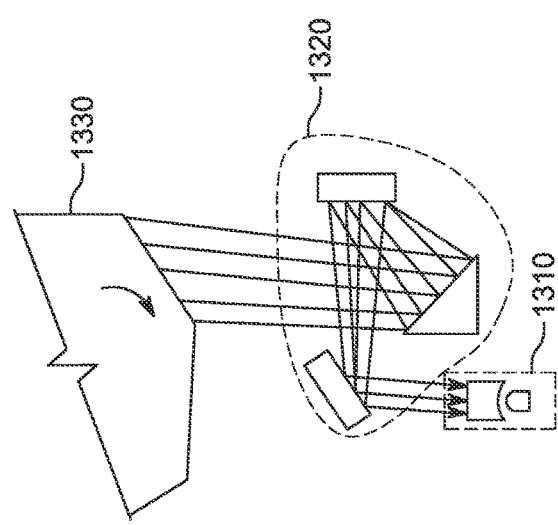
Figure 13D:
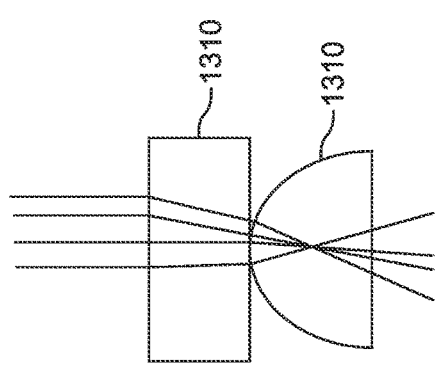

FIG. 13A illustrates the physical shape of light beams being directed to a dual lens assembly in a pulse steering system such as pulse steering system 1200. A polygon scanner such as polygon scanner 1330 may rotate, which may reflect light from individual facets throughout its rotation. Since each facet may be longer (x-direction in FIG. 12) than it is wide (chordal width in the Y-Z plane of FIG. 12), as the return light is focused by mirror system 1320 for delivery to a fiber optic cable, there are different design concerns for each plane. FIGS. 13A and 13B compare physical differences in light angles as light signals reflect off a facet of polygon scanner 1330 and are focused. The chordal width of the facet in the direction illustrated in FIG. 13A may be significantly smaller than the facet length illustrated in FIG. 13B. As a result, the light reflecting off the final mirror in the pulse control system along the plane shown in FIG. 13A will have a significantly lower numerical aperture than the light reflecting off the plane shown in FIG. 13B. An illustration of narrow numerical aperture light angles entering dual lens system 1310 from FIG. 13A is shown in FIG. 13C. An illustration of wide numerical aperture light angles entering dual lens system 1310 from FIG. 13B is shown in FIG. 13D.

Figure 14A:
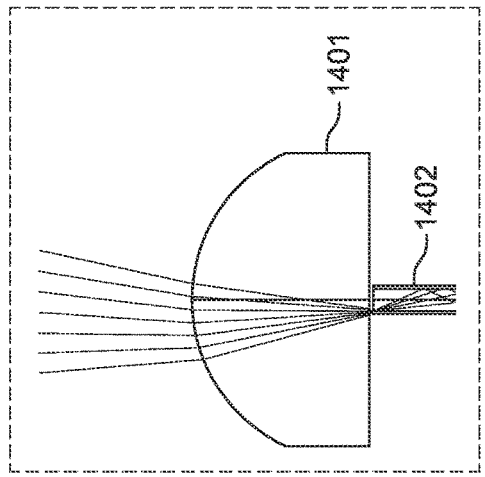
FIGS. 14A-14C depict beam walk-off with and without a field lens.
Figure 14B:
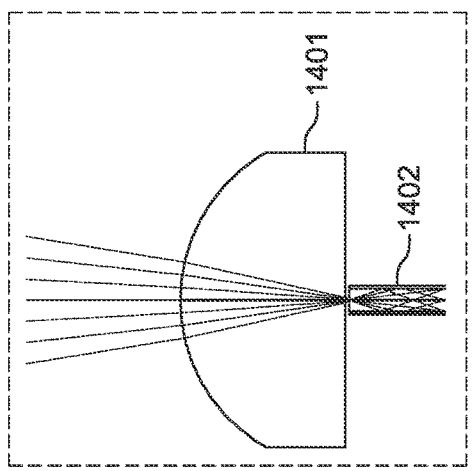
Figure 14C:
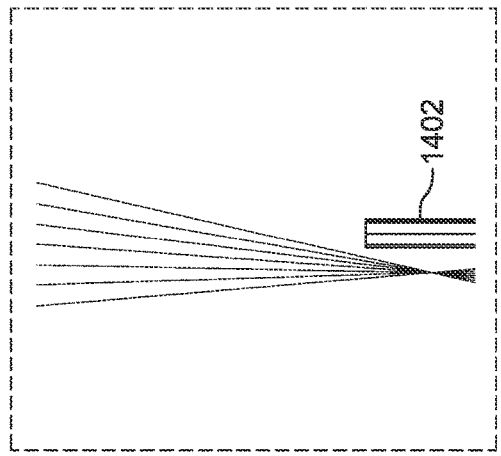

FIGS. 14A-14C are referenced in connection with a description of walk-off in a lens system. As light signals reflect from an object, the time light takes to travel from emitter to object and back to receiver is ΔT. Within this time, the polygon rotates an angle determined by $\Delta\theta = \omega \Delta T$ where $\omega$ is the rotational speed of the polygon. Once the return light is bounced off the polygon facet, it propagates at $2\Delta\theta$ angle with respect to the optical axis of the receiving optical system. As a result, the beam spot on the receiver is shifted by $2\Delta\theta \cdot f$ where f is the effective focus length of the receiving optic. FIG. 14A depicts narrow numerical aperture light reaching field lens 1401 with small amount of walk off (in the case of short object distance), and the light is focused on fiber cable 1402. FIG. 14B depicts narrow numerical aperture light reaching field lens 1401 with walk-off (in the case of long object distance); the field lens redirects and focuses light onto fiber cable 1402. FIG. 14C depicts narrow numerical aperture light with walk-off in the absence of field lens 1401; since the light signal is not redirected towards fiber cable 1402, data is lost. A field lens improves walk-off errors by redirecting the signal to the target even when the light signal fluctuates in space.

Figure 15C:
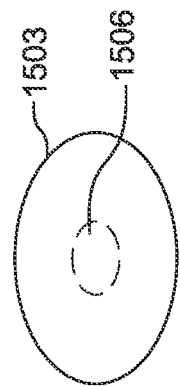
FIGS. 15A-15C depict field lens design characteristics with and with respect to focus of a field lens.
Figure 15B:
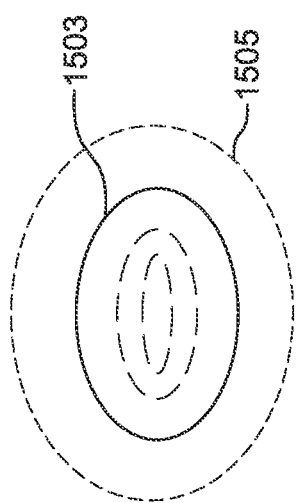
Figure 15A:
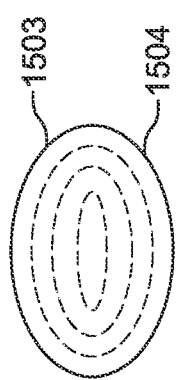

FIGS. 15A-15C different sized spot beams entering a fiber optic cable. It is desirable for the spot beam exiting the dual lens system to have a specified range of spot sizes relative to the cross-section of the core of the fiber optic cable. FIG. 15A illustrates an example where the spot size 1504 is substantially similar to the cross-sectional area of fiber optic cable 1503. FIG. 15B illustrates a spot size 1505 that is substantially greater than the cross-section of fiber optic cable 1503. This results in light falling outside of the fiber optic cable, possibly resulting in lost data. FIG. 15C illustrates a spot size 1506 that is substantially smaller than the cross-sectional area (e.g., less than 30% of the available area). The dual lens system according to embodiments discussed herein can be designed to yield a spot beam size that falls between spot size 1504 and 1506. For example, the desired spot size may range between 90% and 33%, between 95% and 50%, or between 80% and 60% of the cross-sectional area of the fiber optic cable.

Figure 16A:
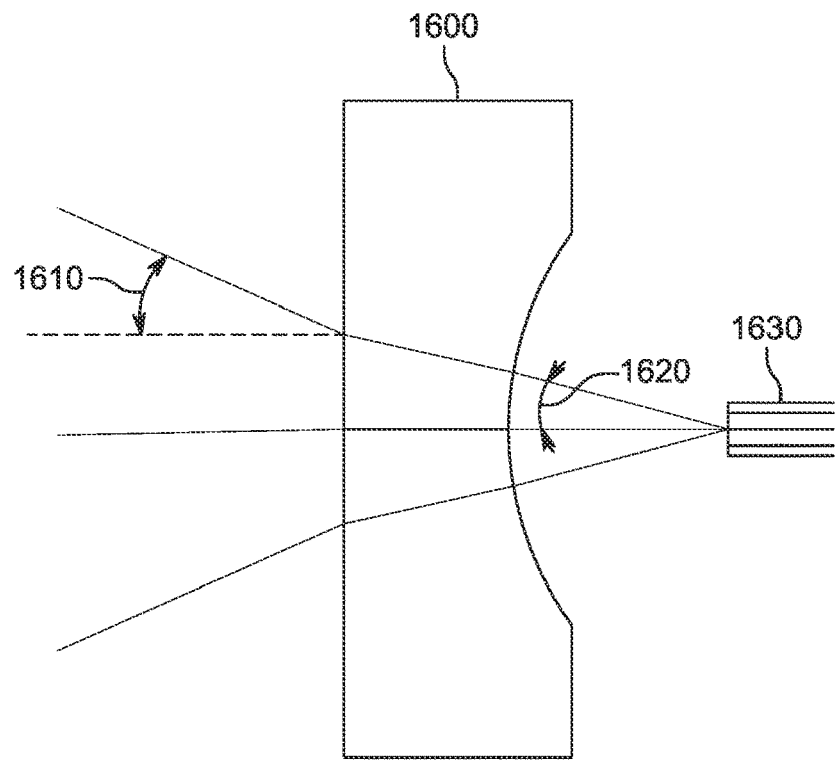
FIGS. 16A-16B depicts control of numerical aperture by a concave lens an its benefits to signal throughput.
Figure 16B:
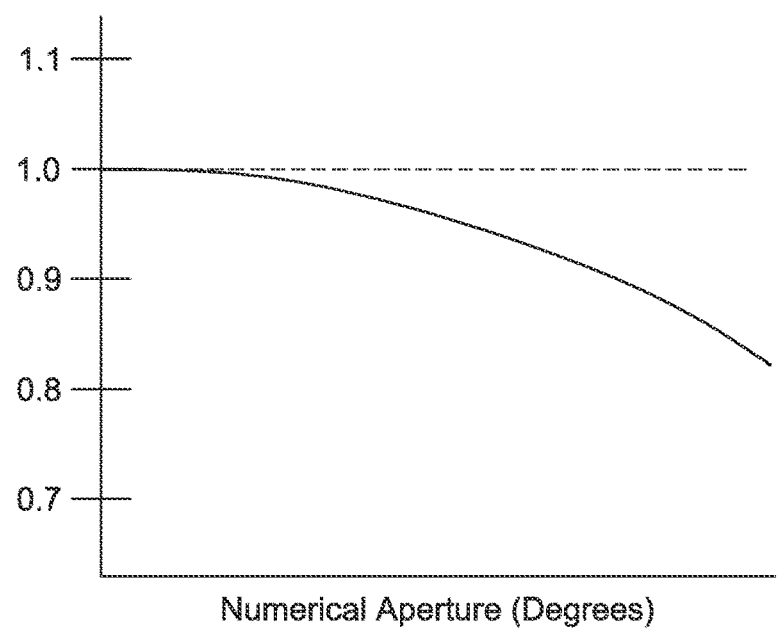

With reference to FIGS. 16A and 16B, numerical aperture correction of a concave lens is now described. Numerical aperture is the maximum acceptance angle within which light can transmit through fiber without loss. In FIG. 16A, light energy with high NA 1610 passes through a concave mirror 1600 with a resulting NA reduction angle 1620 before light enters fiber 1630. FIG. 16B depicts the normalized throughput of light energy through a fiber optic cable such as fiber 1630 with respect to the numerical aperture of light hitting the fiber optic cable. Normalized throughput, expressed as a ratio of light signal entering the fiber optic to the light signal exiting the fiber optic cable, is a measure of loss through the cable. Representative experimental data shown in FIG. 16B illustrates that as numerical aperture increases, losses in the fiber optic cable increase. These losses are undesirable in a LiDAR system.

Figure 17A:
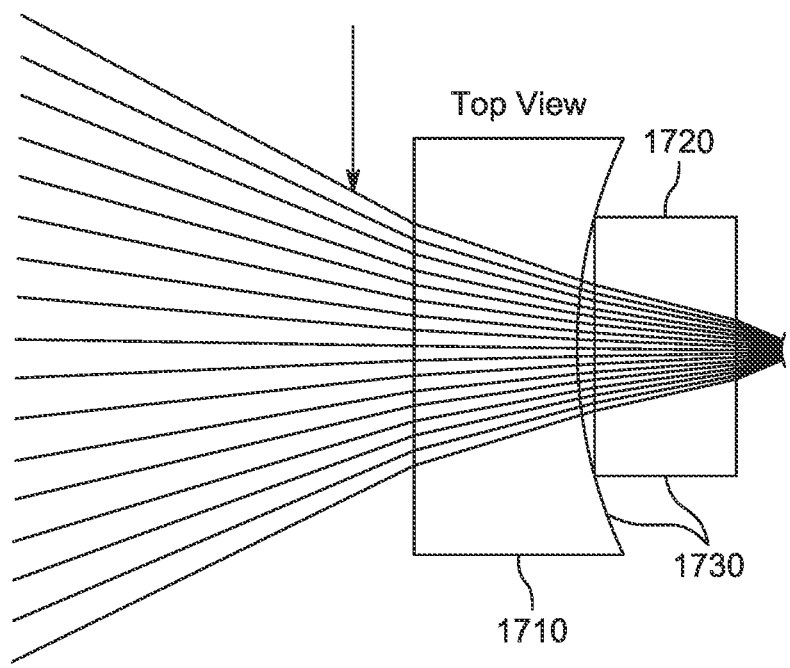
FIGS. 17A-17B illustrate a dual lens system and how the concave and field lenses perform on two perpendicular planes.
Figure 17B:
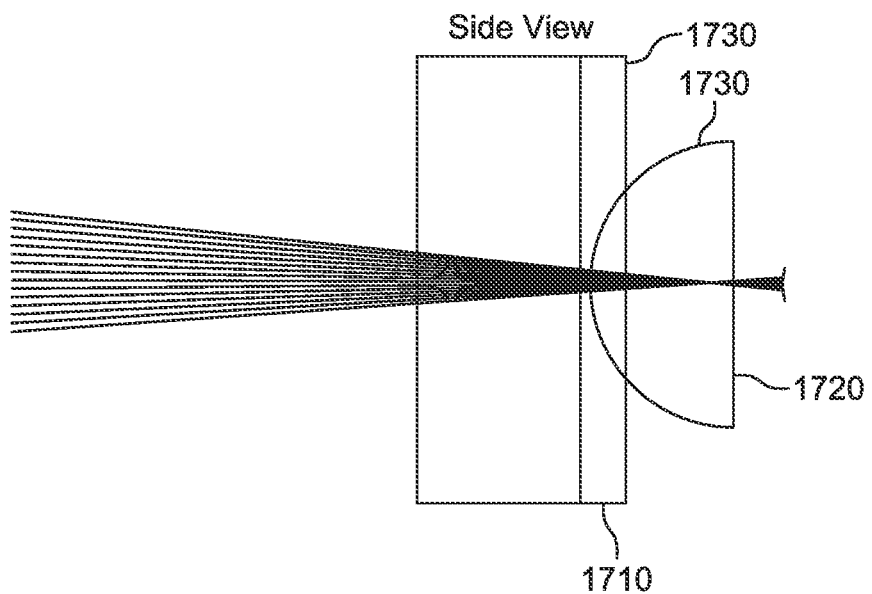

FIGS. 17A and 17B show different views of a dual concave cylindrical lens/field lens system. FIG. 17A shows the top view dual lens system 1730, which receives high numerical aperture light such as shown in view 1320 (of FIG. 13B). The data loss from the high numerical aperture light represented by FIG. 17A may be improved by concave lens 1710 of a dual lens system while field lens 1720 may not affect light in this plane. FIG. 17B shows the side view of dual lens system 1730, which represents narrower numerical aperture light such as shown in view 1310 (of FIG. 13A). The susceptibility to walk-off from the low numerical aperture light represented by FIG. 17B may be improved by field lens 1720 of a dual lens system while concave lens 1710 may not affect light in this plane. The dual lens system described in this embodiment allows the benefits of two lens designs to be designed to improve walk-off characteristics, increase the tolerance of walk-off error, and reduce numerical aperture depending on the angle of light presented in either perpendicular plane.

FIGS. 17A and 17B also illustrate the design parameters related to the shapes of a concave cylindrical lens and a field lens that may be used in a dual lens system. In the top view shown in FIG. 17A, the concave cylindrical lens may have a flat, transparent surface on the upstream side and a transparent concave shape on the downstream side. In the side view shown in FIG. 17B, the concave lens may have a flat, transparent surface on the upstream side and a flat, transparent surface on the downstream side. In this way the concave lens may affect the focus of light in only one plane. Further design parameters of the concave lens may involve overall surface dimensions, radius of the concave surface on the downstream surface, material, anti-reflective coatings, and optical surface dimensions.

In the side view shown in FIG. 17B, the field lens may be illustrated as a convex cylindrical shape. The top view shown in FIG. 17A illustrates the field lens viewed at 90 degrees from the convex shape of the lens, and is shown as a rectangular surface. In this way the field lens may affect the focus and walk-off characteristics of incoming light in only one plane. Further design parameters of the field lens may involve convex curve radius, overall dimensions, material, anti-reflective coatings, and optical surface dimensions.

Figure 18:
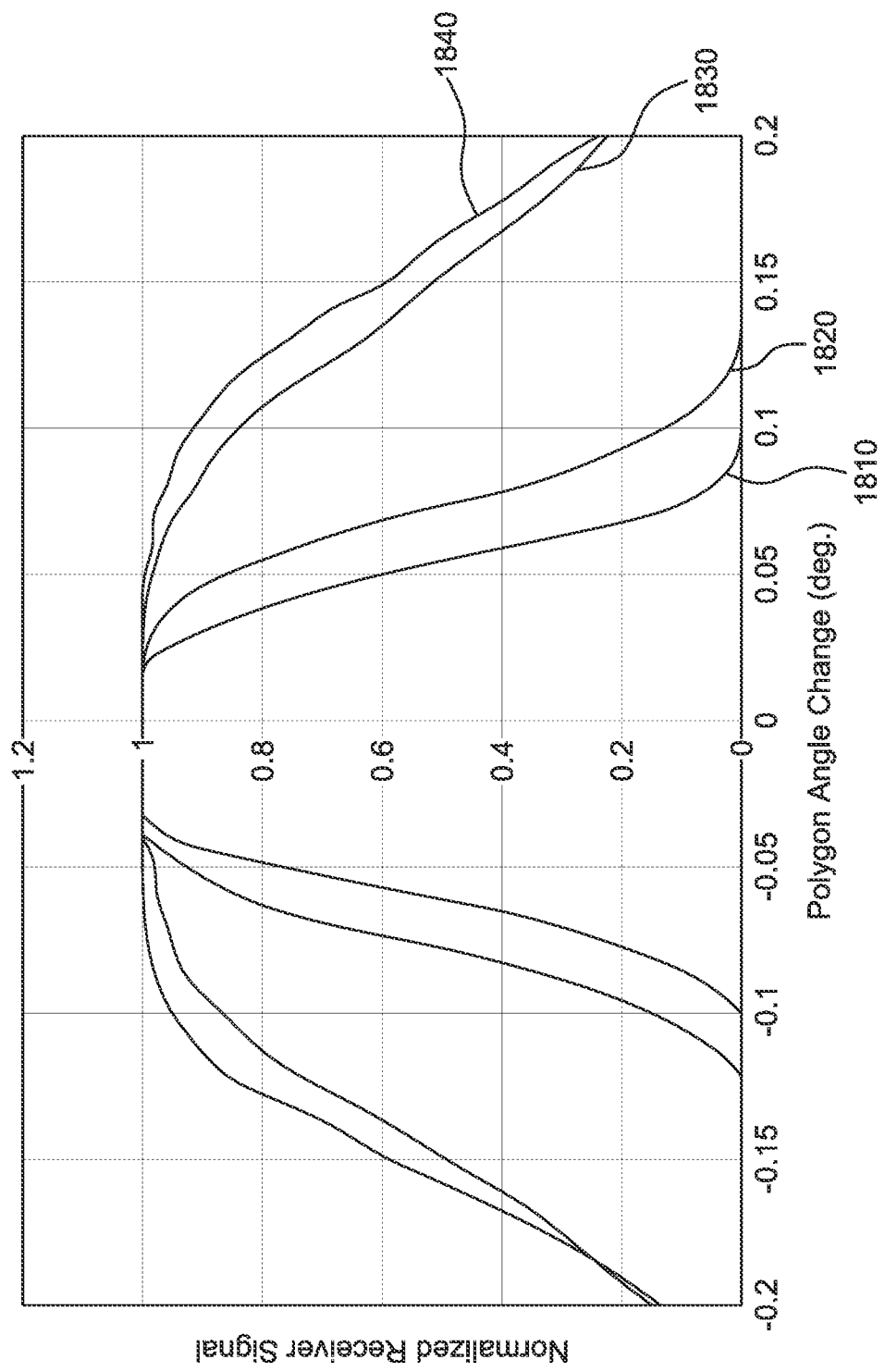
FIG. 18 depicts LiDAR detection system data loss improvement with various lens systems compared to a no lens system.

FIG. 18 illustrates the benefits of the dual lens system as well as its design parameters. FIG. 18 plots example experimental normalized receiver signal strength with respect to the angle of a polygon scanner such as polygon scanner 1203. Due to walk off and data loss from high numerical aperture, as polygon scanner angle changes normalized signal strength through the system changes. Data trace 1810 represents a normalized receiver strength signal if no lens correction is made, and data is lost at relatively low polygon scanner angles. Data trace 1820 represents a normalized receiver signal strength if a sample off-the-shelf convex lens is used upstream of the fiber optic cable and shows an increased robustness to data loss for high polygon scanner angles compared to data trace 1810. Data trace 1830 represents a normalized receiver signal strength if a non-optimized dual lens system including a concave lens and field lens is used, and illustrates significant improvement in robustness to data loss for high polygon scanner angles compared to data traces 1810 and 1820. Data trace 1840 represents a normalized receiver signal strength if an optimized dual lens system (such as those presented herein) is designed for the application and represents further increased robustness to data loss for high polygon scanner angles compared to data trace 1830. FIG. 18 demonstrates that a dual lens system such as those discussed herein results in improvements in overall LiDAR system performance by mitigating data loss possible by using a dual lens system including a concave lens and a field lens.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-18, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

The invention claimed is:

1. A light detection and ranging (LiDAR) system comprising:
   a light source configured to generate a plurality of pulse signals that is transmitted by the LiDAR system;
   a multi-lens assembly positioned along an optical receive path, wherein the multi-lens assembly comprises:
   a concave lens, and
   a field lens positioned downstream of the concave lens; and
   a fiber configured to receive returned light pulses along the optical receive path from the multi-lens assembly, wherein the returned light pulses are formed based on the transmitted pulse signals.

2. The LiDAR system of claim 1, wherein the concave lens is a concave cylindrical lens.

3. The LiDAR system of claim 1, wherein the concave lens accounts for numerical aperture correction for the returned light pulses entering the fiber.

4. The LiDAR system of claim 1, wherein the field lens is a cylindrical field lens.

5. The LiDAR system of claim 1, wherein the field lens has a convex cylindrical shape.

6. The LiDAR system of claim 1, wherein the field lens directs the returned light pulses into the fiber or a light detector.

7. The LiDAR system of claim 1, further comprising:
one or more mirrors configured to steer the returned light pulse along the optical receive path.

8. The LiDAR system of claim 7, wherein the field lens accounts for angle variation imposed on the returned light pulses by the one or more mirrors.

9. The LiDAR system of claim 7, wherein the one or more mirrors include at least one of a polygon mirror and a parabolic mirror.

10. The LiDAR system of claim 1, wherein a focal length of the concave lens is different than a focal length of the field lens.

11. The LiDAR system of claim 1, wherein the fiber comprises a core and wherein the multi-lens assembly is configured such that a beam size resulting from the returned light pulses is optimized for entry into the core.

12. The LiDAR system of claim 1 further comprising:
a light detector configured to receive the returned light pulses from an end of the fiber.

13. A light detection and ranging (LiDAR) system comprising:
a steering system operative to steer a plurality of returned light pulses along an optical receive path;
a fiber configured to receive the plurality of returned light pulses along the optical receive path; and
a multi-lens assembly positioned along the optical receive path in between the steering system and the fiber, wherein the multi-lens assembly comprises:
a concave lens, and
a convex lens, the multi-lens assembly optimizing a spot beam produced by the plurality of returned light pulses for entry into the fiber.

14. The LiDAR system of claim 13, wherein the concave lens is a concave cylindrical lens.

15. The LiDAR system of claim 13, wherein the concave lens accounts for numerical aperture correction for the returned light pulses entering the fiber.

16. The LiDAR system of claim 13, wherein the convex lens is a cylindrical convex lens.

17. The LiDAR system of claim 13, wherein the steering system comprises one or more mirrors.

18. The LiDAR system of claim 13, wherein the convex lens accounts for angle variation imposed on the returned light pulses from the steering system.

19. The LiDAR system of claim 13, wherein the steering system comprises a polygon mirror and a parabolic mirror.

20. The LiDAR system of claim 13, wherein the multi-lens assembly mitigates data loss of the returned light pulses entering the fiber.

* * * * *